US007016524B2

(12) United States Patent
Moore

(10) Patent No.: US 7,016,524 B2
(45) Date of Patent: Mar. 21, 2006

(54) SYSTEM FOR AUTHENTICATING AND PROCESSING OF CHECKS AND OTHER BEARER DOCUMENTS

(76) Inventor: Lewis J. Moore, 3623 Latrobe Dr., Suite 120, Charlotte, NC (US) 28211

( * ) Notice: Subject to any disclaimer, the term of this patent is extended or adjusted under 35 U.S.C. 154(b) by 659 days.

(21) Appl. No.: 10/100,239

(22) Filed: Mar. 18, 2002

(65) Prior Publication Data

US 2003/0023557 A1 Jan. 30, 2003

Related U.S. Application Data

(63) Continuation-in-part of application No. 09/413,461, filed on Oct. 6, 1999, now Pat. No. 6,456,729, which is a continuation-in-part of application No. 08/911, 415, filed on Aug. 14, 1997, now Pat. No. 6,246,778, which is a continuation-in-part of application No. 08/740,656, filed on Oct. 31, 1996, now Pat. No. 5,895,073, which is a continuation-in-part of application No. 08/633,538, filed on Apr. 17, 1996, now Pat. No. 6,005,960, which is a continuation-in-part of application No. 08/420,034, filed on Apr. 11, 1995, now Pat. No. 5,592,561, which is a continuation-in-part of application No. 08/227,662, filed on Apr. 14, 1994, now abandoned.

(51) Int. Cl.
*G06K 9/00* (2006.01)

(52) U.S. Cl. ....................... 382/137; 382/100; 382/138

(58) Field of Classification Search ................ 382/137, 382/138; 705/5
See application file for complete search history.

(56) References Cited

U.S. PATENT DOCUMENTS

| | | | | |
|---|---|---|---|---|
| 4,558,318 | A | 12/1985 | Katz et al. | |
| 4,742,340 | A | 5/1988 | Nowik et al. | |
| 4,862,143 | A | 8/1989 | Hirshfield et al. | |
| 5,283,422 | A | 2/1994 | Storch et al. | |
| 5,337,361 | A * | 8/1994 | Wang et al. | 380/51 |
| 5,390,251 | A | 2/1995 | Pastor et al. | |
| 5,491,325 | A * | 2/1996 | Huang et al. | 705/45 |
| 5,509,692 | A * | 4/1996 | Oz | 238/70 |
| 5,673,320 | A * | 9/1997 | Ray et al. | 713/176 |
| 5,781,629 | A * | 7/1998 | Haber et al. | 713/177 |
| 5,912,974 | A * | 6/1999 | Holloway et al. | 380/51 |
| 6,170,744 | B1 * | 1/2001 | Lee et al. | 235/380 |
| 2002/0128967 | A1 * | 9/2002 | Meyer et al. | 705/40 |

* cited by examiner

*Primary Examiner*—Bhavesh M. Mehta
*Assistant Examiner*—ONeal R. Mistry
(74) *Attorney, Agent, or Firm*—Law Office of Tim Cook P.C.

(57) ABSTRACT

A bearer document processing system includes preparation, verification, redeeming and depositing of the document. An encrypted symbol is imprinted on the document using ink that is not visible in invisible light. The symbol includes information used to authenticate the document and to identify the bearer of the document. The document is scanned at a transaction point. The symbol can be decoded at transaction points or at a remote central processing station. Accounts involved in transactions are credited and debited using information contained in the encoded symbol and other information provided by the bearer and the acceptor of the document. Transactions are performed in essentially real-time, and the bearer is provided with evidence of a successful transaction. Although applicable to any type of bearer document such as stock certificates, money orders, the system is particularly applicable to processing bank checks in real-time and with the possibility of fraudulent transactions being minimized.

46 Claims, 5 Drawing Sheets

FIG.1
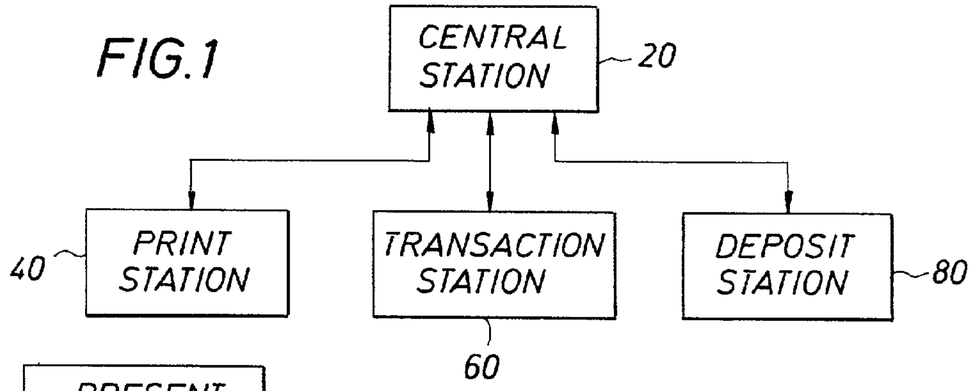
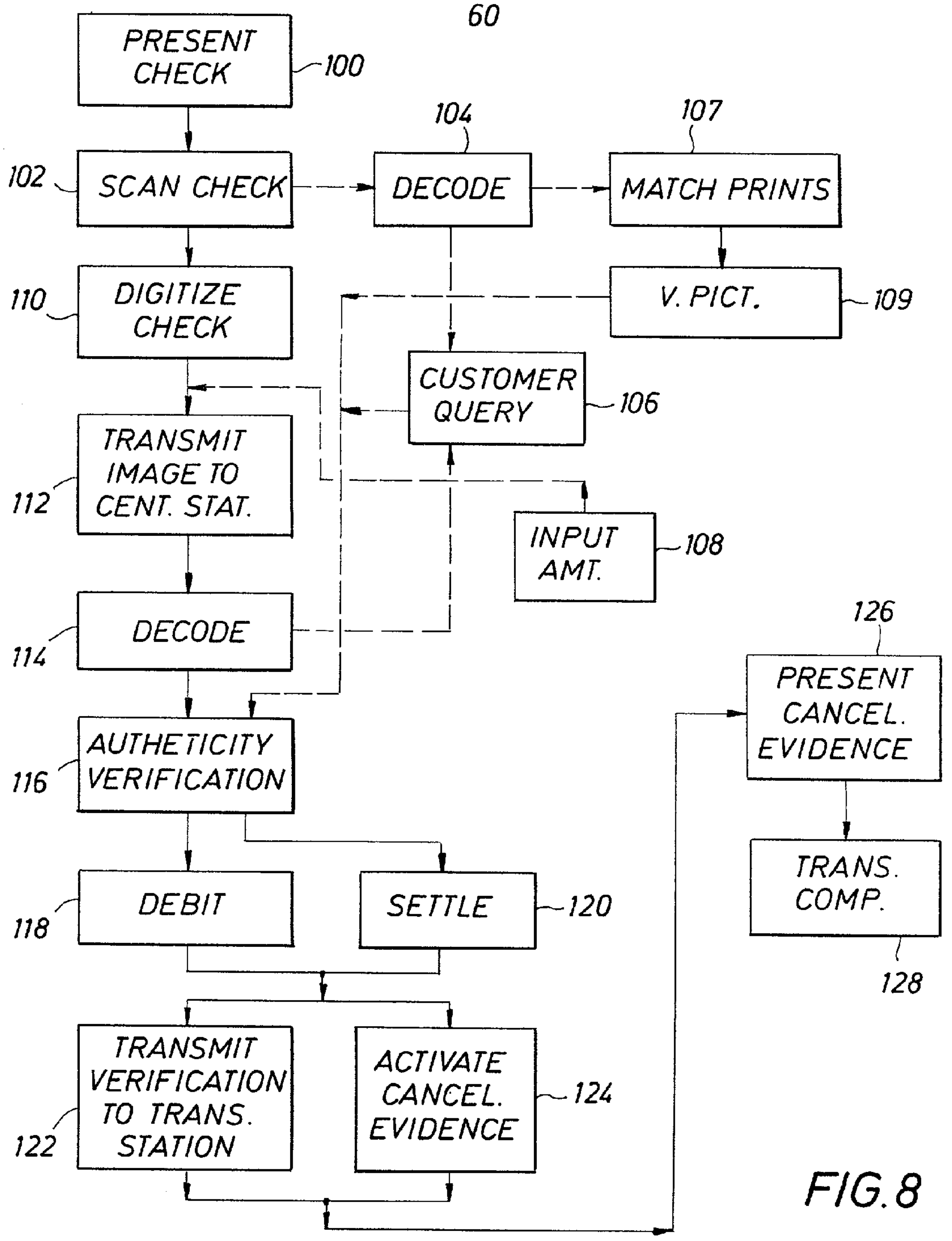
FIG.8

FIG. 4a
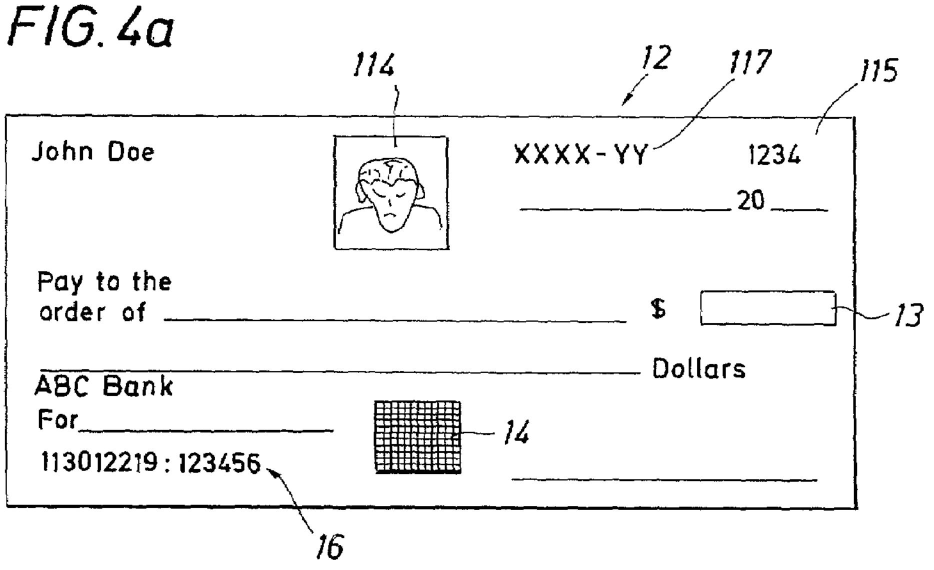
FIG. 4b
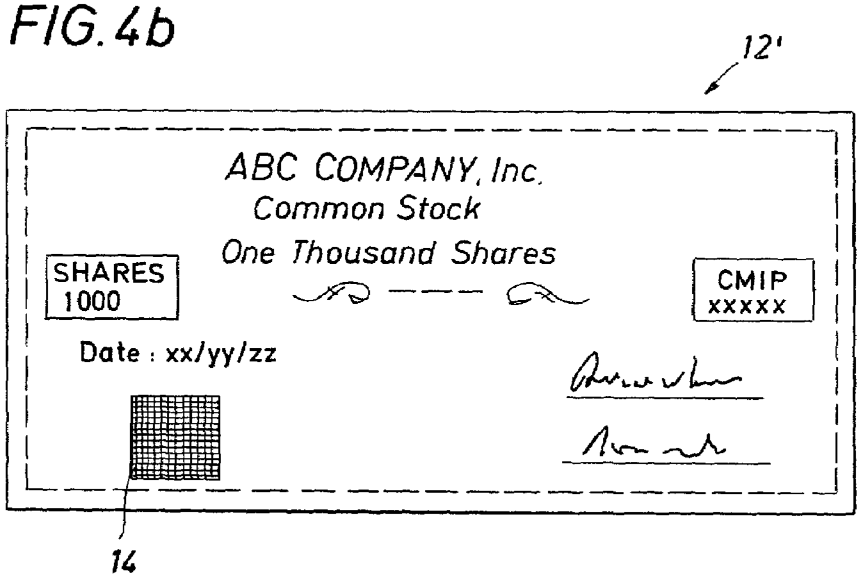
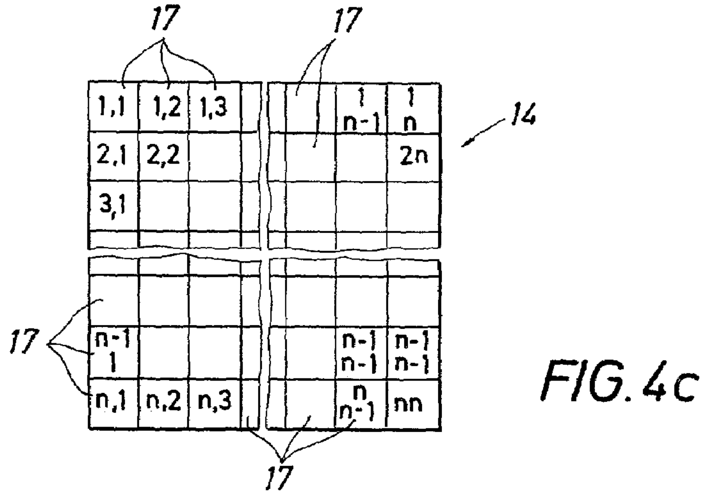
FIG. 4c

SYSTEM FOR AUTHENTICATING AND PROCESSING OF CHECKS AND OTHER BEARER DOCUMENTS

This application is a Continuation-In-Part of application Ser. No. 09/413,416, filed Oct. 6, 1999 now U.S. Pat. No. 6,456,729; which is a Continuation-In-Part of Ser. No. 08/911,415, filed Aug. 14, 1997, now U.S. Pat. No. 6,246,778; which is a Continuation-In-Part of Ser. No. 08/740,656, filed Oct. 31, 1996, now U.S. Pat. No. 5,895,073, which is a Continuation-In-Part of Ser. No. 08/633,538, filed Apr. 17, 1996, now U.S. Pat. No. 6,005,960; which is a Continuation-In-Part of Ser. No. 08/420,034, filed Apr. 11, 1995, now U.S. Pat. No. 5,592,561; which is a Continuation-In-Part of Ser. No. 08/227,662, filed Apr. 14, 1994, now abandoned.

BACKGROUND OF THE INVENTION

1. Field of the Invention

This invention is directed to a system for verifying the authenticity of an instrument and for processing bearer documents such as financial documents, and more particularly directed to a system for verifying the authenticity of a check, for identifying a bearer of a check, and for settling and reconciling in real-time accounts related to check cashing and check deposit transactions.

2. Background of the Art

Bearer documents have been used for centuries to settle accounts in trade and a variety of other financial transactions. Bearer documents include bank drafts or "checks", stock certificates, bond certificates, deeds, money orders, travelers checks and the like. Early bearer documents were prepared and processed manually. These manual procedures were typically labor and time consuming, somewhat inaccurate, and generally unsuitable as the volume and scope of commerce increased.

During the past several decades, efficiency in the bearer document processing and handling has improved with the introduction of various coding systems and electronic scanning systems. As an example, modem bank drafts, hereafter referred to as "checks", are encoded with visible markings that identify a financial institution, bank routing and transit numbers, and an account number. The encoded information, referred to as the MICR number, can be electronically scanned when processing a check thereby increasing the efficiency in debiting the proper account in the proper financial institution. As another example, stock and bond certificates often include encoded information, such as visible bar codes, which identify pertinent financial information regarding the bearer certificates. Other present day bearer documents such as travelers checks, money orders, deeds and the like often include encoded visible markings that aid in processing and handling.

In further examining the prior art, attention will be directed primarily toward the processing of checks. Processing includes the redemption or "cashing" of a check against an account, the depositing of checks into an account, and the settling of accounts involved in the transactions.

The check redemption process is typically initiated when a customer presents a check to a vendor in exchange for cash, in the amount to cover a purchase of merchandise, or some combination thereof. When fraud is involved, checks are typically redeemed to obtain cash rather than to obtain merchandise. Checks typically include a visible, machine readable MICR numeric code that identifies an account number from which funds will be drawn, and routing and transit numbers of a financial institution that holds funds within the specified account. A bank is an example of such a financial institution. The check also typically includes a visible, clear text check number. The vendor passes the check through a scanning device. The scanning device reads the MICR numeric information imprinted visibly on the check, and transmits the information to a remote check verification center. Land telephone communication is typically used to link the vendor's scanner with the check verification center.

The check verification center maintains a file, commonly referred to as a "negative" file, which lists a variety of historic financial data that can be related to numbers within a MICR number. As an example, the file lists the number of checks redeemed against an account with insufficient finds. These checks are commonly referred to as "bounced" checks. As another example, the file may also lists negative credit rating information, such as defaulted or missed loan payments, attributable the owner of the account. It is emphasized that the negative file contains only historic information regarding the account and the account owner. Furthermore, the file contains only "negative" financial information regarding the account and the owner of the account, thus the origin of the file name. If an account number within the file has no negative annotation, this indicates that there have been no historical problems involving the account or the owner of the account.

The check verification center returns, to the point of check scan, an indication of whether or not it has found any match with the scanned MICR number and information contained within the historic negative file. If no match is found, it is assumed that the check is authentic, the bearer of the check is the owner or an authorized representative of the account, and that the account contains at present sufficient funds to cover the amount of the check. The vendor typically redeems the check if no match in the negative file is indicated. If a match is found, the vendor is thereby warned of a potential problem with the check based upon historic data. The vendor must now decide whether or not to accept the questionable check. The decision can be based upon criteria such as no questionable checks are accepted for redemption, only questionable check less than a predetermined monetary limit are accepted for redemption, questionable checks are accepted for redemption only after approval of the check by a manager, and the like.

The vendor periodically gathers together all redeemed checks for further processing. Typically, these checks are gathered together as a batch at the end of a business day, and this batch is physically transported to a financial institution, such as a bank. The vendor can deliver the batch to the bank, or the batch can be picked up and delivered by a third party, such as an armored car delivery service. The bank processes the checks and settles accounts within the bank through normal banking procedures. The batch is then physically transported to a financial clearing house (operated by the Federal Reserve System within the United States) where numeric MICR information on the check is scanned, the amount of the check is tabulated, and the bank settles with other banks involved in the transactions using normal banking procedures. During processing, the check is physically and electronically "cancelled" so that it can not be redeemed or processed again.

At the end of a time period such as a month, evidence of the cancelled check is sent to the owner of the account. This can be the actual cancelled check, an image of the cancelled check, or a tabulation of the check number of cancelled check.

The check cashing process described above exhibits several significant deficiencies that can be costly, inconvenient and time consuming to all parties involved in the transaction. These deficiencies are summarized in the following paragraphs.

Within the prior art system, the vendor and the check verification center assume that the check is authentic and not a counterfeit. The vendor can visually inspect the check for authentic paper weight and other authenticating physical properties, but modern copying equipment has rendered the visual identity of counterfeit checks essentially impossible. The system as described provides no quantitative means for checking the authenticity of the check.

With the prior art system, it is assumed that the bearer of the check is, in fact, the owner of the account specified in the MICR code, or is an authorized representative of the account specified in the MICR code. The identity of the bearer can only be checked manually by the vendor. As an example, the vendor may ask to see the bearer's driver's license in an attempt to verify the name, signature and appearance of the bearer. This method of checking identity is flawed. As an example, the bearer can posses a fraudulent drivers license. The prior art system provides no quantitative means for verifying the true identity of the bearer.

If the check is counterfeit, or if the check is authentic but stolen, redemption of the check by an unauthorized person results in a loss to the true owner of the account, a loss to the vendor, a loss to the financial institution, or a loss to all parties.

Processing within the prior art system is also costly, risky and time consuming. Using the example above, batches of redeemed checks are first transported to the bank typically at the end of the business day. This is costly, time consuming and risky in that the batches can be lost, stolen or catastrophically destroyed during transportation. The batches must again be physically transported to a central clearing house at a cost in time and money, and at risks of being lost, stolen or catastrophically destroyed during transportation. Often twenty four hours or more elapse between initial redemption by the vendor and the final settling of all accounts involved.

Finally, the prior art system requires that evidence of the cancelled check be physically sent to the owner of the account within a given time interval, which is typically one month. This again is costly and time consuming.

The previous discussion is directed to steps involved in redeeming or cashing a check using prior art systems. An integral part of the checking system also involves the depositing of checks into an account at a financial institution such as a bank. Deposits can be made directly at the bank, or alternately at an unmanned automatic teller machine (ATM) which are readily available and heavily used by the public. Prior art deposit process at an ATM will be discussed. Typically a deposit form, indicating the amount of the deposit and the account into which the deposit is to be made, is completed by the customer. The deposit form, along with the check or checks to be deposited, are placed in an envelope which, in turn, is placed in a secured ATM drop-box. Present banking laws in the United States require that the banks pick up deposits, if any, once every twenty four hours at every ATM through which the bank has consented to accept deposits. Experience has shown that the cost to pick up is about seventy five dollars per ATM. If there are no deposits at a given ATM within a twenty four hour period, or if the amount of the deposits is relatively small, the financial institution can incur a significant loss in servicing the "low volume" ATM deposit. Even with a reasonable deposit total, the deposits must be picked up and physically transported to the bank where the deposit is processed and involved accounts are settled.

Deposits made at the bank, rather than at a remote ATM, must still be processed as outlined above. Using prior art methodology, the subject account is usually not settled until the following day.

Prior art ATM deposit procedures are also subject to fraud. In particular, there is no quantitative method for checking authenticity of the checks since no human representing the bank is present at the transaction to make even a qualitative judgement of authenticity. Although check deposits at a teller window at a bank can be visually inspected by the teller, there is still no quantitative procedure that can be used by the teller to delineate authentic checks from sophisticated copies.

The present invention is directed toward eliminating or minimizing previously discussed deficiencies in prior art methods and apparatus for processing bearer documents such as checks.

SUMMARY OF THE INVENTION

This disclosure is directed toward a system for processing a bearer document by (a) affixing an encrypted symbol on the document, (b) subsequently scanning and decoding information contained in the symbol to establish authenticity of the document, (c) using the scanned information to identify the bearer of the document when the document is being redeemed, and (d) adjusting balances of accounts related to the document in real time using the decoded information. The encrypted symbol is preferably invisible in natural light, but methods of the disclosure are, in general, also applicable to a symbol that is visible in natural light. The system is applicable to a wide variety of documents including, but not limited to, bank drafts of "checks", account deposit forms, stock certificates, bond certificates, travelers checks, money orders, and deeds to real property.

The system comprises a central processing station, a printing station where an encrypted symbol is preferably imprinted on documents to be processed, typically a plurality of transaction stations in which the document are redeemed, and typically a plurality of deposit station in which documents are collected and processed. As stated above, the system is applicable to a wide variety of bearer documents. The invention will, however, be disclosed using a bank draft or "check" as an example of a bearer document.

The central processing station controls overall operation of the system. Typically the central station is located at a financial institution such as a bank or a central clearing house. The central processing station communicates with other elements of the system via telephone land lines, satellites communication links, the internet, or any other suitable communication means for the two-way transfer of digital or analog data.

The printing station is typically located at a check manufacturing facility. In addition to normal graphics and identifying information visible in natural light, the encrypted symbol is printed on each check at the printing station. The symbol is preferably invisible in natural light, and preferably in the form of an encrypted matrix containing authenticating information and identifying information related to the owner of the account. The printing station can optionally be controlled from the central processing station. As examples of this control, the central processing station can specify information to be encoded within the symbol, and specify an allotment of imprints. Imprinted checks can also be optionally scanned at the printing station to verify that the imprinted symbol is readable and contains the correct information. Other information can be affixed to the check at the printing station that can be used in quantitatively establishing the identity of an authorized bearer of the check. This additional information includes, but is not limited to, a digital photograph and a digital finger print image of an authorized bearer of the check.

A transaction station is typically located at any vending facility where a bearer or "customer" remits a check in payment for merchandise, or remits a check in exchange for cash. A transaction station would typically be located at a retail outlet such as a pharmacy, department store or super market. The system typically comprises a large number of transaction stations. For purposes of discussion, it will be assumed that the encrypted symbol and any other images such as a digital photograph and a finger print will be printed with ink which is invisible in natural light. Each transaction station comprises a scanner that contains a light source that activates the encrypted symbol and other optional images so that they can be read or displayed. The scanner forms a digital image of both visible graphics and the symbol. The transaction station also contains a circuit, such as a chip, which decodes the encrypted symbol into ASCII or clear text. The monetary amount of the check can be obtained from the appropriate field of the scanned image of the check. Alternately, the vendor or the customer can specify the monetary amount of the check using an input means at the transaction station, such as a key pad. The digital image, including the amount of the check, is transmitted in real-time to the central processing location wherein the check is authenticated, the balance of the customer's account is determined, the customer's account is debited or "reconciled" for the amount of the check if sufficient funds are available, and the vendor's account is credited or "settled" for the amount of the check. Notification of the authenticity of the check, and of the completion of the reconciling/settling transaction is sent from the central processing station to the transaction station. These notifications are preferably displayed in clear text on a display screen that can be easily viewed by the vendor. It should be noted that processing functions are performed in real-time. In this context, "real-time" is defined as the sum of time intervals required to transmit data from the transaction station to the central processing location, to electronically authenticate the check, to settle accounts at the central processing location, and to transmit data from the central processing station back to the transaction station. Other information related to the customer, which is read from the symbol, can also be presented to the vendor in clear text. As an example, a customer password can be displayed on the screen of the transaction station. If the customer can recite the password to the vendor, the vendor has some assurance that the check, although previously proven to be authentic, is not stolen and that the customer is, in fact, the owner or an authorized representative of the account.

If imprinted on the check, a digital picture of an authorized bearer can be activated by the light of the reader and displayed on the screen of the transaction station. The vendor can then compare the displayed picture with the face of the customer thereby further establishing identity. As mentioned previously, an image of an authorized bearer's finger print can be optionally imprinted on the check preferably in ink which is invisible in natural light. The transaction station can alternately be equipped with a finger print imaging apparatus. The customer can be asked to place the appropriate finger on the imager, and a digital image of the customer's finger print is generated. The image of the customer's finger print is then electronically compared with the image of the authorized bearer's finger print image to further establish bearer identity. Comparison is preferably made using a comparitor at the transaction station. Alternately, both images can be transmitted to the central processing location for comparison.

The transaction station also provides the customer evidence of a cancelled check, in real-time, as soon as the account balanced is reconciled. The evidence can be the actual check imprinted with a cancellation mark at the transaction station, an image of the check printed at the transaction station, or some other type of binding evidence that the transaction has been successfully completed. The transaction station (a) protects the vendor from accepting checks drawn on an account containing insufficient funds, (b) protects the owner of the account from the use of counterfeit checks by unauthorized persons, (c) protects the owner of the account from the use of authentic checks by unauthorized persons, (d) protects the bank from any responsibility or dispute over insufficient funds, (e) eliminates delay in reconciling and settling accounts involved in the transaction, and (f) eliminates the costs to the bank in processing and distributing evidence of cancelled checks at the end of a specified time interval.

A deposit station is typically located at an existing ATM facility. A large number of deposit stations are typically controlled by the central control station. The deposit station comprises a scanner into which a customer inserts checks to be deposited into an account. Again assuming that the encrypted symbol is imprinted in ink invisible in natural light, the scanner contains a light source that activates the symbol so that it can be read. The scanner also forms a digital image of each check including the encrypted symbol. The amount of each check can be obtained from the appropriate field of the digitized check image. Alternately, the customer can input the amount of each check using and input means, such as a key-pad, at the deposit station. Furthermore, the customer inputs an account number signifying into what account the deposit is to be made. The deposit station also contains a circuit, such as a chip, which decodes the encrypted symbol into ASCII or clear text. The image of each deposited check, the deposit check amount, and the account number receiving the deposit are transmitted in real-time to the central processing station. At the central processing station, the checks are authenticated, the customer's account is settled, and account or accounts of the issuers of the deposited checks are reconciled using information obtained from the decoded symbol and alternately from other input information. All steps are performed essentially in real-time. Notification of the completed transaction is given to the customer. At this time, the check or checks being deposited are deposited into a secured ATM drop-box. Since the transaction has been completed in real-time, the deposited checks can be picked up at the ATM facility in compliance with current banking law, and without concern of meeting the current twenty-four hour pick-up requirement for manually processed deposits.

BRIEF DESCRIPTION OF THE DRAWINGS

So that the manner in which the above recited features, advantages and objects the present invention are obtained and can be understood in detail, more particular description of the invention, briefly summarized above, maybe had by reference to the embodiments thereof which are illustrated in the appended drawings.

FIG. 1 is a functional diagram of the system;

FIG. 4*a* illustrates a typical bank draft or "check" bearing an encrypted symbol and other graphics either visible or invisible in natural light;

FIG. 4*b* illustrates a typical stock certificate bearing an encrypted symbol;

FIG. 4*c* illustrates conceptually an encrypted symbol embodied as a m×n matrix;

FIG. 8 is a flow diagram of operations typically performed at a transaction station.

DETAILED DESCRIPTION OF THE PREFERRED EMBODIMENTS

The system disclosed is applicable for processing a wide range of bearer document bearer documents including checks, stock certificates, bearer bond certificates, money orders and travelers checks. An encrypted symbol, which is preferably in matrix form, is affixed to each document to be processed. The symbol is preferably invisible in natural light. Methods disclosed are also applicable to a symbol that is visible in natural light, but the symbol is preferably invisible in natural light for reasons that will become apparent in this disclosure. The symbol is subsequently scanned to form a digital image and the symbol is decoded. Decoded information contained in the symbol is used to verify authenticity of the document, establish the identity of the bearer, and used to adjust account balances involved in the transaction. The process is completed essentially in real-time. Other images, used primarily to identify the bearer, can alternately be affixed to the document. Invisibility in natural light is preferred for these alternate images.

FIG. 1 is a functional diagram of the system comprising a central processing station 20, a printing station 40 at which an encoded symbol is affixed onto documents to be processed, typically a plurality of transaction stations 60 (only one shown) at which documents are redeemed, and typically a plurality of deposit stations 80 (only one shown) at which documents are collected. As stated above, the system is applicable to a wide variety of bearer documents. The invention will, however, be disclosed using a bank draft or "check" as an example of a bearer document.

Figure 2:
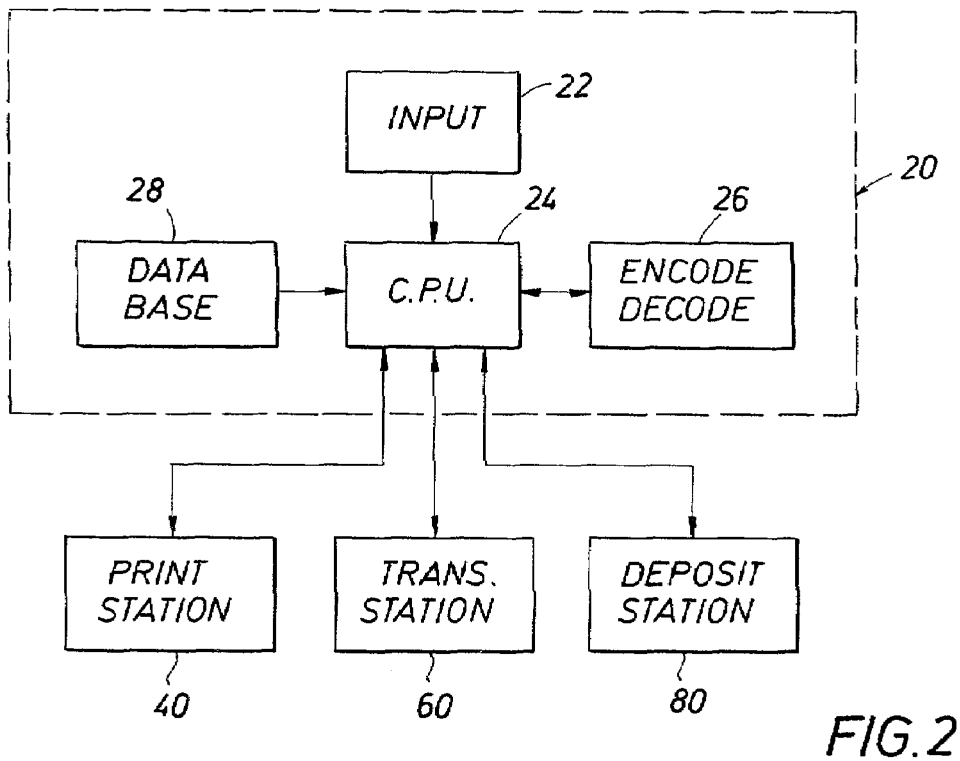
FIG. 2 is a functional diagram of a central processing station.

FIG. 2 is a functional diagram of the central processing station 20, which controls the processing system. The station 20 contains a central processing unit (CPU) which cooperates with an archive data base 28. The data base 28 contains account numbers, account balances, data that indicate authenticity of a check, and a variety of information on the owner of the account. The CPU 24 also cooperates with an encoding/decoding device 26. The encoding/decoding device 26 decodes encrypted symbols from imaged checks. Decoded information is compared with archived information stored in the data base 28 to determine authenticity of a processed check, and to aid in identifying the bearer of the check. This process will be discussed in detail in a subsequent section of this disclosure. The encoding/decoding device 26 is also used to define and allot encrypted symbols to be affixed on checks, as will also be discussed in more detail in a subsequent section of this disclosure. Information such as account numbers, account owner information, and the like can be entered into the data base 28 by means of in input device 22 operating through the CPU 26. Information entered into the system by means of the input device 22 and through the CPU 24 can also be used to control the operation of the encode/decode device 26. The central processing station 20 is typically located at a bank or at a clearing house. The plurality of transaction stations 60 and plurality of deposit stations 80 are remote from central processing station 20. One or more printing stations 40 (only one shown) are also typically remote from the central processing station 20. The central processing station 20 is in two way communication with other elements 40, 60 and 80 of the system via telephone land lines, satellites communication links, the internet, or any other suitable communication means for the two-way transfer of data.

Figure 3:
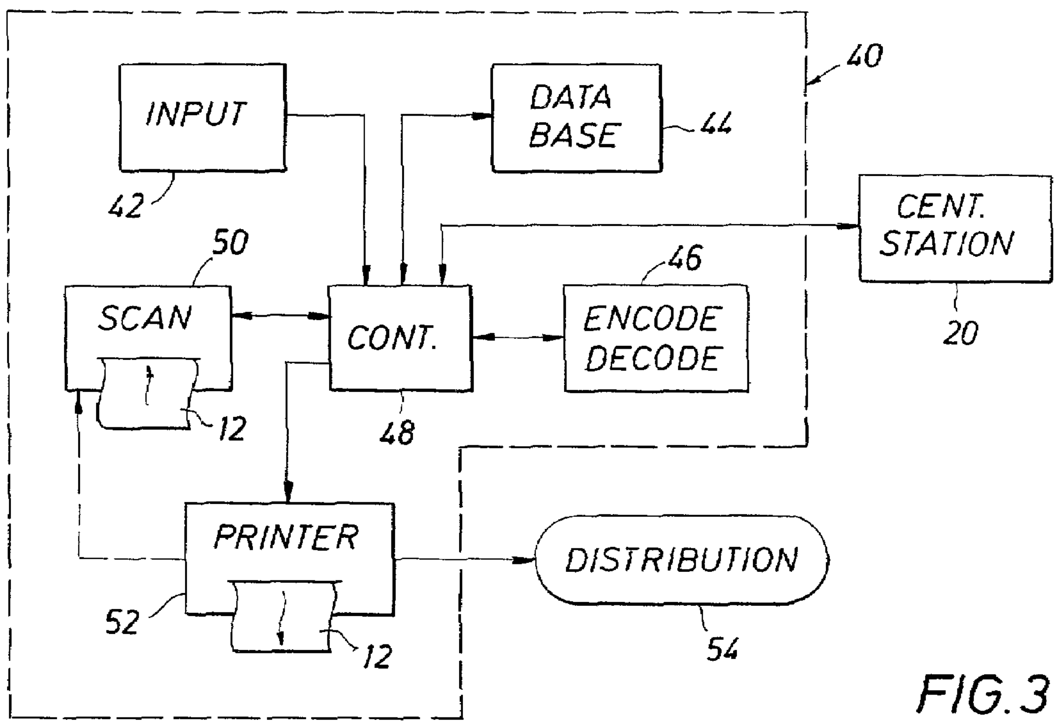
FIG. 3 is a functional diagram of a printing station 40.

FIG. 3 is a functional diagram of a printing station 40, which affixes encrypted symbols and optionally other images onto checks. It is preferred that the encrypted symbols and other images be printed on the checks. Alternately, the encrypted symbol and other images can be affixed to the check by other means including stamping, etching and symbol transfer. Hereafter, it will be assumed that encrypted symbols, and any optional images, are printed onto the checks. A controller 48 controls the printing station 40. Information to be included in the encoded symbol is typically supplied from the central processing station 20 and entered into a data base 44 through the controller 48. Alternately, the information can be input into the data base 44 through the controller 48 by means of an input device 42 located at the printing station. Information for the symbol can be supplied as encrypted information, or supplied as clear text information, which is subsequently encoded by an encoding/decoding device 46 under the control of the controller 48. Once the symbol has been formatted, it is transferred to a printer 52 through the controller 48 wherein it is printed onto the check 12. The symbol is printed using ink that is preferably invisible in natural light, and preferably configured in the form of a matrix containing authenticating and other information pertinent to the checking account, the owner of the checking account, and the bank that holds the account. The printer can also be used to print normal graphics, check numbers, clear text routing and transit numbers, and MICR numbers found on checks. These elements visible in natural light. As an optional check of the accuracy and readability of the imprinted symbol, the imprinted check can be passed through a scanner 50 wherein the symbol is decoded by the encoding/decoding device 46 cooperating with the controller 48. The decoded information is then compared with information stored in the data base 44 to verify accuracy and readability. The printing station is typically located at a check manufacturing facility. A plurality of printing stations 40 is used if the bank uses a plurality of manufacturers to produce checks. Check printing can be further controlled from the central processing location 20. As an example, an allotment of symbols can be assigned to each printing station. The allotment is transmitted to the controller 48. A counter is incremented with each symbol printing. Once the allotment is reached, additional printing at the printing station 40 is disabled from the central processing center 20.

FIG. 4*a* illustrates a typical bank draft or "check" 12. Illustrated graphics, check number 115 routing and transit numbers 117, and the MICR number 16 comprising machine readable account, routing and transit numbers are all visible in natural light. The amount of the check is entered in numeric form in the field 13. The encrypted symbol 14 is, as previously discussed, preferably not visible in natural light. Field 114 contains optional additional information that is used primarily to establish identity of the bearer. This optional information is preferably a digital photograph of an authorized bearer, or a digital image of a finger print of an authorized bearer. These images are preferably printed in ink that is invisible in natural light.

FIG. 4*b* illustrates a typical stock certificate 12'. Again, illustrated graphics are visible in natural light, but the imprinted encrypted symbol 14 is preferably not visible in natural light.

FIG. 4*c* illustrated an encrypted symbol 14 configured as an m×n matrix, wherein the matrix elements are identified by the numeral 17. The symbol is typically measures about ½ inch×½ inch, and contains about 152 alphanumeric characters.

Details of methods and apparatus for forming, printing, allotting, affixing, tracking and reading encrypted symbols which are invisible in natural light are disclosed in U.S. Pat. Nos. 5,592,561, 5,895,073, 5,917,925, 6,005,960 and 6,246,778, which assigned to the assignee of this application and which are hereby incorporated into this disclosure by reference. As an example, U.S. Pat. No. 5,592,561 teaches the printing of encrypted symbols which are invisible in natural light, the allotment of a specified number of symbol imprints which is controlled by a central processing station. As another example, U.S. Pat. No. 5,895,073 teaches the use of infrared dye that is activated only at a specific wavelength. As yet another example, U.S. Pat. No. 6,005,960 teaches affixing symbols to a variety of articles, wherein the symbols are encrypted and invisible in natural light.

Figure 5:
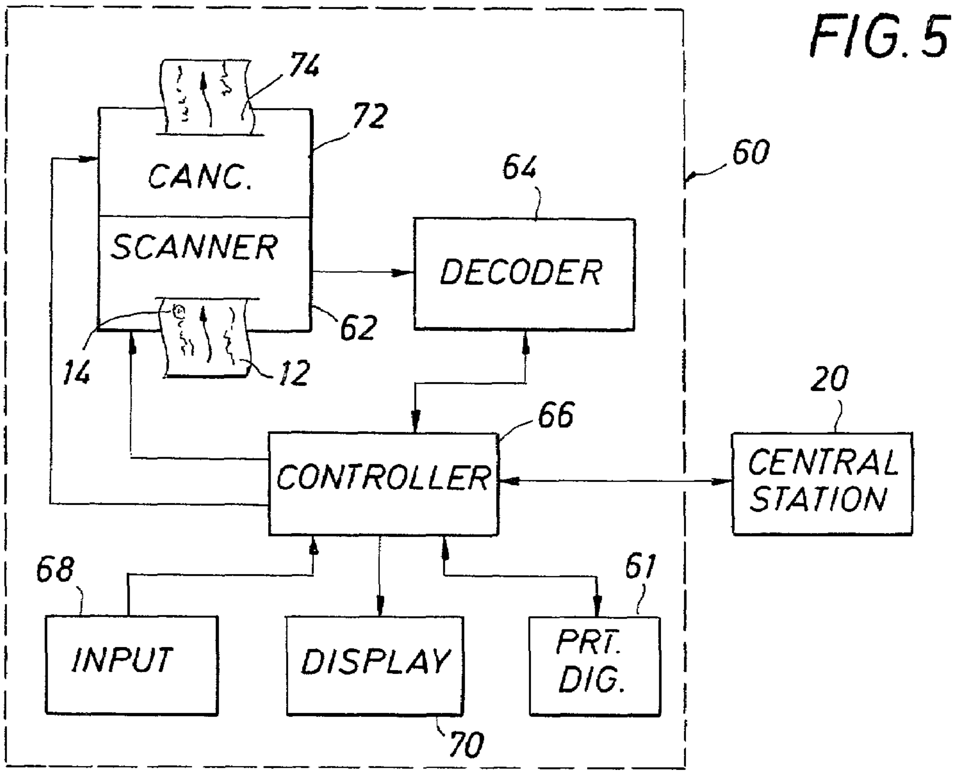
FIG. 5 is a functional diagram of a transaction station.

FIG. 5 is a functional diagram of a transaction station 60. Each transaction station 60 comprises a scanner 62 that receives a check 12. The scanner contains a light source (not shown) which activates the encrypted symbol 14, which is invisible in natural light, imprinted on the check 12. Once activated, the symbol 14 can be read. The scanner 62 forms a digital image of both visible graphics and the symbol 14 of the check 12. A controller 66, which is operationally connected to the central processing station 20 by a suitable two-way communication link, controls the scanner 62. The transaction station 60 also contains decoder 64, such as a chip, which is controlled by the controller 66 and which decodes the encrypted symbol 14 into ASCII or clear text. The monetary amount of the check can be obtained from the appropriate field 13 of the scanned image of the check 12. Alternately, the vendor or the customer can enter the monetary amount of the check using an input means 68, such as a key pad, which is operationally connected to the controller 66. The digital image, including the amount of the check in numerical form in the field 13, is transmitted in real time to the central processing station 20. At the central processing station 20, the check 12 is authenticated, the balance of the customer's account is determined, the customer's account is debited or "reconciled" for the amount of the check if sufficient funds are available, and the vendor's account is credited or "settled" for the amount of the check. Some of these steps typically involve comparing scanned information with archived information contained in the data base 28 of the central processing station 20. As an example, an authenticity indicator scanned is compared with an authenticity indicator stored in the data base 28. As another example, the monetary amount of the check (displayed numerically in the field 13 of the check) is compared with the current balance of the customer's account to verify funds are sufficient to cover the amount of the check. Information specifying the account to be settled is preferably supplied automatically to the central processing station 20 by activation of the transaction station 60. As an example, if the transaction station is operated at a super market, the super market's account information is preferably preprogrammed in the controller 66 and automatically transmitted to the central processing station 20 when a check is scanned. Alternately, appropriate account information can be entered manually through the input device 68.

Notifications of the authenticity of the check and the successful completion of the reconciling/settling transaction is sent from the central processing station 20 to the controller 66 of the transaction station 60. This notification is preferably displayed in clear text on a display screen 70, which is in view of the vendor and operationally connected to the controller 66. These steps are performed essentially in real-time. Additional "customer specific" information read from the symbol 14 can also be presented to the vendor in clear text on the display screen 70. As an example, a customer password or the maiden name of the customer's mother can be displayed on the display screen 70. Customer specific information is also be stored in the archive data base 28 of the central processing station 20 for subsequent comparison to establish identity of the bearer of the check. The customer is typically asked to recite this highly personal, customer specific information to the vendor. If recited correctly, the vendor then has a high degree of confidence that the check, although previously proven to be authentic, is not stolen and that the customer is, in fact, the owner or an authorized representative of the account. The transaction station 60 also provides the customer evidence 74 of a cancelled check by means of a cancellation device 72 operationally connected to the controller 66. Evidence 74 is presented essentially in real-time, as soon as the accounts involved are settled. The evidence 74 can be the actual check 12 imprinted with a cancellation mark at the transaction station, an image of the check printed by the cancellation device 72, or some other type of binding evidence that the transaction has been successfully completed.

Still referring to FIG. 5, supplemental images in the field 114 (see FIG. 4*a*), which are preferably invisible in natural light, are visibly activated by the light of the scanner 62. If the image 114 is a digital picture of an authorized bearer, then this picture is displayed on the display 70. The vendor can then compare the displayed picture with the face of the customer thereby further establishing identity. A digital image of an authorized bearer's finger print can be used several ways to quantify the identification process. Preferably imprinted in invisible ink, the digital image of the finger print is read by the scanner 62. The transaction station can alternately be equipped with a finger print digitizing apparatus 61, which is known in the art. The customer can be asked to place a finger on the digitizer 61, and a digital image of the customer's finger print is generated. The image of the customer's finger print is then electronically compared with the image of the authorized bearer's finger print image scanned from the check. Comparison between the two finger print images can be made using a comparitor (not shown) within the controller 66 at the transaction station 60. Alternately, both images can be transmitted to the central processing station 20 for comparison. Comparison is preferably made using the comparitor at the transaction station 60. A match between the imprinted finger print of an authorized bearer and the finger print of the customer provides a quantitative identification of the customer as an authorized bearer.

In summary, the functions of the transaction station 60 and cooperating central processing station 20 (a) protect the vendor from accepting checks drawn on an account containing insufficient funds, (b) protect the owner of the account from use of counterfeit checks by unauthorized persons, (c) protect the owner of the account from use of authentic checks by unauthorized persons, (d) protect the bank from any responsibility or dispute over insufficient funds, (e) eliminate the delay debiting and settling accounts involved in the transaction, and (f) eliminate the costs to the bank in processing and distributing evidence of cancelled checks at the end of a specified time interval.

Although only one transaction station 60 is shown in the function diagram of the system depicted in FIG. 1, a plurality of transaction stations are operationally connected to the central processing station 20. A transaction station 60 is typically located at any vending facility where a customer remits a check in payment for merchandise, or presents a check for redemption or "cashing". More specifically, a transaction station 60 would typically be located at a retail outlet such as a pharmacy, department store, super market, and the like.

Figure 6:
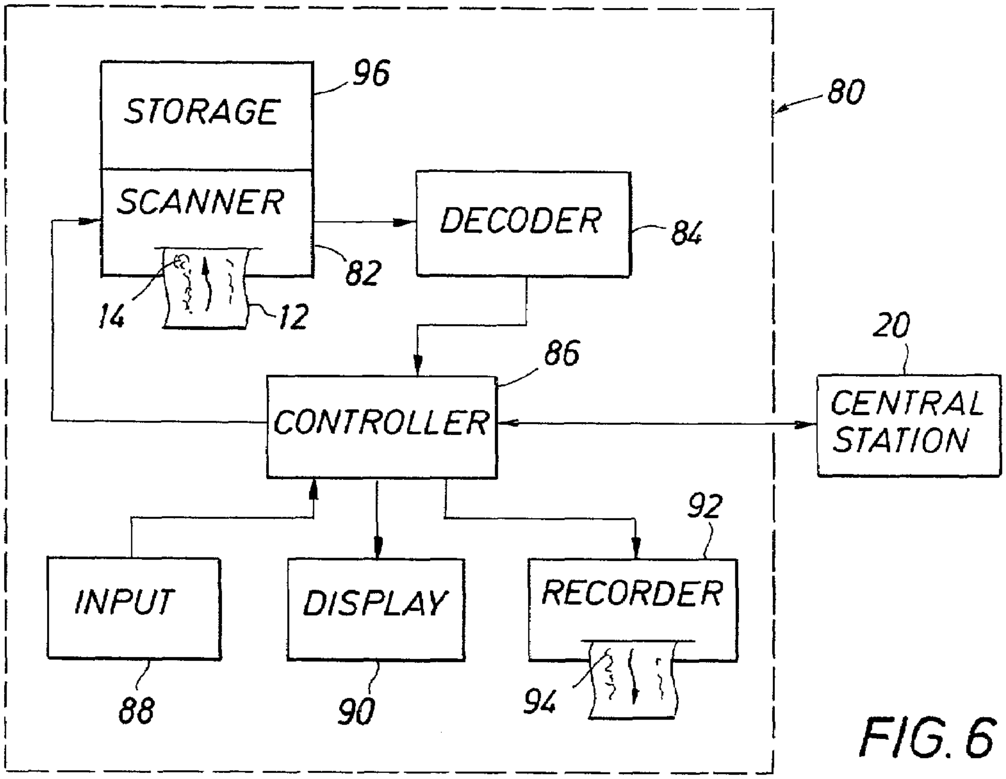
FIG. 6 is a functional diagram of a deposit station.

FIG. 6 is a functional diagram of a deposit station 80. A deposit station is typically located at an existing ATM facility, and many existing elements of the ATM can be used by the deposit station. These elements include the ATM display screen, communication link, printer, document input device and the like. Alternately, the deposit station can be a "stand-alone" facility. As with transaction stations 60, a large number of deposit stations 80 are typically controlled by the central processing station 20. The deposit station 80 comprises a scanner 82 into which a customer inserts checks 12 to be deposited into an account. The scanner 82 is controlled by the controller 86. The scanner 82 contains a light source (not shown) which activates the symbol 14 (invisible in natural light) imprinted on the check so that the symbol can be read by the scanner. The scanner 82 also forms a digital image of each check 12 including the imprinted symbol 14. A monetary amount of each check can be obtained from the appropriate field 13 of the digitized check image. Alternately, the customer can input the monetary amount of each check using and input device 88, such as a keypad, which is operationally connected to the controller 86. Furthermore, the customer can input an account number into the input device 88 signifying the account into which the deposit is to be made. Alternately, the customer can insert a "deposit slip" which contains a second encrypted symbol that identifies the customer and information pertinent to the customer's account which is to receive the deposit. The deposit station 80 also contains a decoding device 84, such as a chip, which decodes the encoded symbol 14 into ASCII or clear text. The images of the deposited checks 12, the deposit amount, and the account number of the deposit are transmitted by the controller 86 in real-time to the central processing station 20. At the central processing station 20, the checks are authenticated, the customer's account is settled, and account or accounts of the issuers of the deposited checks are reconciled based upon information obtained from the decoded symbol. All steps are performed essentially in real-time. The customer can be prompted through the deposit steps with information displayed on the display screen 40. The status of the deposit, such as verified authenticity of deposited checks, can also be displayed on the display screen 40. Notification of the completed transaction is transmitted from the central processing station 20 to the controller 86, and displayed on a display screen 90 which is in clear view of the customer. Evidence 94 of a successful deposit, such as a deposit receipt, is generated for the customer's records by a receipt printing device 92. At this time, the check or checks 12 being deposited are placed in a storage container 96. Since the transaction has been completed in real-time, the deposited checks can be picked up at the deposit station at the bank's convenience, and without concern of meeting the twenty-four hour pick-up requirement for manually processed deposits.

Fraudulent transactions at a deposit station consist primarily of the use of counterfeit checks. The process above is designed to virtually eliminate the use of counterfeit checks. Fraudulent transactions involving unauthorized bearers of the deposit are minimal. Stated another way, situations in which an unauthorized person make an unauthorized deposit into an account are somewhat remote. It should be noted, however, that some of the apparatus and methods (such as finger print matching procedures) previously used to identify a bearer at a transaction station can also be used to identify a bearer at a deposit station.

The previously discussed configurations of the central processing station 20, printing station 40, transaction station 60 and deposit station 80 are preferred, but it should be understood that other apparatus configurations can be used to obtain the same described results.

Operation of the system will be disclosed again using the check processing procedure as an example. It should be understood, however, that the process is equally applicable to other types of bearer documents as previously discussed.

Figure 7:
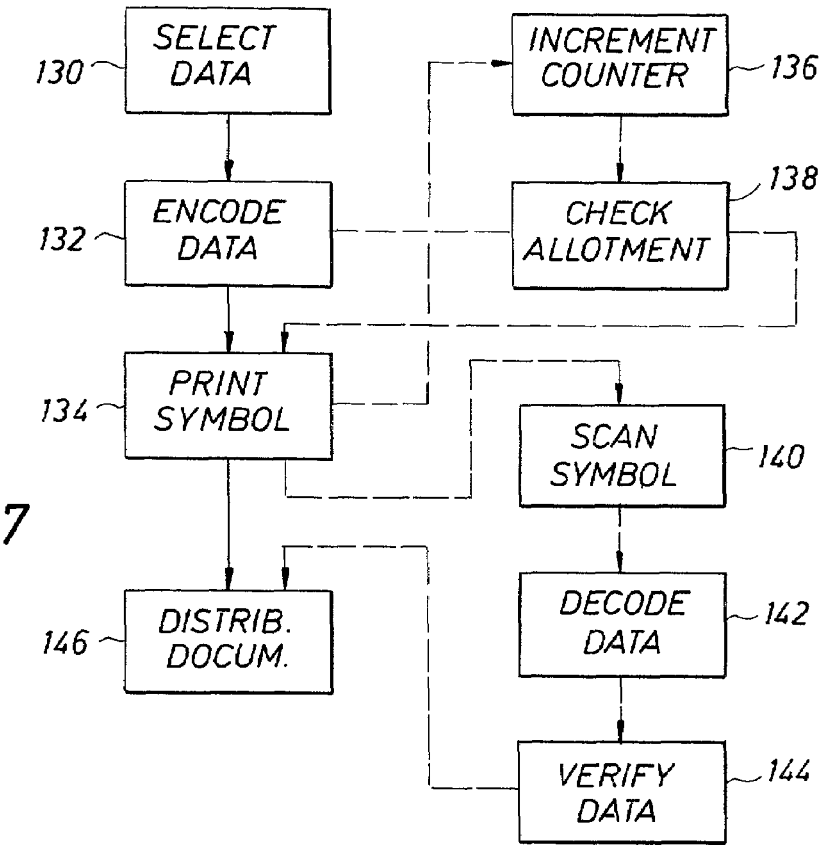
FIG. 7 is a flow diagram of operations typically performed at a printing station.

FIG. 7 is a flow diagram of operations typically performed at a printing station 40 shown in FIG. 3. Data to be included in the encrypted symbol 14 are selected and entered at step 130. These data include authenticating information, pass words, and the like as previously discussed. Data can be entered by means of the input device 42, drawn from the data base 44, or supplied remotely from the central processing station 20 by means of the communication link. Data are encoded at step 132, and the encrypted symbol 14 is imprinted on the check 12 at step 134. If an allotment of printed checks has been assigned, a counter is incremented at step 136, compared with the designated allotment number at step 138, and the printing process is continued if the allotment number has not been exceeded. The allotment number feature is optional in the operation of the system. Once the encrypted symbol is printed, the symbol can be scanned at step 140, decoded at step 142, and the readability and accuracy of the symbol can be verified at step 144. Again, this verification process is an optional feature of the system. Checks imprinted with the encrypted symbol 14, which is invisible in natural light, are distributed for use at step 146.

FIG. 8 is a flow diagram of operations typically performed at a transaction station shown in FIG. 5. A check 12 is presented to the scanner 62 at step 100. The check is scanned and digitized at steps 102 and 110, respectively. The symbol 14 can be optionally decoded at step 104 at the transaction station using the decoding device 64. The customer can be queried by the vendor concerning customer-specific information at step 106. Optionally, finger print matching occurs at 107. Optionally, a digital picture of an authorized bearer is examined at step 109. The digitized check image and information of the account to be settled are transmitted to the central processing station 20 at step 112. The encrypted symbol 14 can optionally be decoded at the central processing station 20, and customer specific information can be transmitted back to the transaction station in clear text for customer query at step 106. The authenticity of the check is verified at the central processing station 20 at step 116. The identity of the bearer is also verified at step 116 using input from the query step 106 and the optional finger print matching steps 107 and digital photograph viewing at step 109. The balance of the account is checked and, if sufficient finds are available, accounts involved in the transaction are reconciled and settled in essentially real-time at steps 118 and 120, respectively. Verification of a successful transaction is sent from the central processing station 20 to the transaction station at step 122. The device 72 is activated at step 124 to generate evidence of a cancelled check. The customer is presented evidence of a cancelled check at step 126. Completion of a successful transaction is displayed on the display device 70 at step 128.

Figure 9:
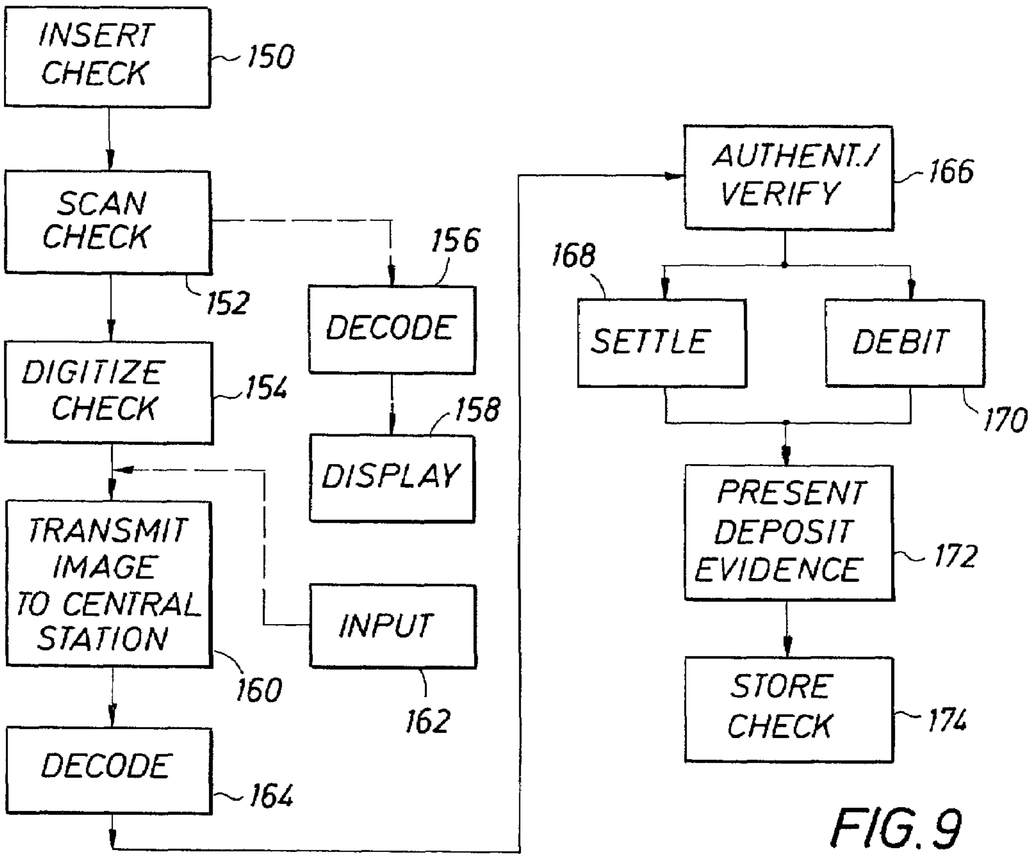
FIG. 9 is a flow diagram of operations typically performed at a deposit station.

FIG. 9 is a flow diagram of operations typically performed at a deposit station shown in FIG. 6. Checks 12 to be deposited are inserted into the scanner 82 at step 150. The checks are scanned at step 152. The encrypted symbol 14 can be optionally decoded at step 156 by the decoding device 84, and decoded information displayed in clear text on the display 90 at step 158. The check 12 is digitized at step 154, and the digitized image is transmitted to the central processing station 20 at step 160. The encrypted symbol 164 is decoded at the central processing station at step 164. Based upon information decoded, the authenticity of the check is verified at step 166. The balance of the account is checked and, if sufficient funds are available, accounts involved in the transaction are settled and debited at steps 168 and 170, respectively. Notification of a successful transaction is sent from the central processing station 20 to the controller 86 of the deposit station, and the customer is notified of the status of the transaction via the display screen 90. Evidence of a successful deposit, such as a deposit receipt, is generated for the customer at step 172. Deposited checks are stored at step 174 for subsequent pickup by the bank.

It should be understood that the previously discussed operational steps are preferred, but other operational procedures can be used to obtain the same results.

Apparatus and methods discussed above for check transaction work equally well for other types of bearer documents. As an example, a transaction station is located at a branch office of a brokerage firm. A customer submits a share certificate for redemption. The encrypted symbol on the certificate is scanned, pertinent account information is obtained by decoding the symbol, the certificate authenticity is checked, identity of the customer bearing the certificate is checked, the cash account of the customer is credited with the current value of the stock, and cash account the issuer of the stock is debited for the value of the stock. The share account of the customer is debited for the number of shares of stock, and the share account of the issuer of the stock is credited with the number of shares. Ownership of the stock shares is, therefore, returned to the issuer. Accounts are settled in real-time at a central processing. As another example of a stock transaction, assume that a customer wishes to deposit stock into a brokerage account. The encoded information on the certificate is scanned, pertinent account information is again obtained by decoding the symbol, the certificate authenticity is checked, and the shares are debited from the share account in the books of the issuing company and credited to the customer's brokerage account. Again, accounts are settled in real-time at the central processing station.

While the foregoing disclosure is directed toward the preferred embodiments of the invention, the scope of the invention is defined by the claims, which follow.

I claim:

1. A method for processing a bearer document comprising the steps of:

(a) affixing a first encrypted symbol upon the document;

(b) affixing a second encrypted symbol to a deposit slip;

(c) upon submission of the deposit slip, scanning the deposit slip, thereby decoding the second encrypted symbol;

(d) identifying an account to be settled using information obtained from the second encrypted symbol;

(e) upon submission by a bearer of said document for processing, (i) scanning said first symbol thereby decoding information contained in said first symbol wherein said first symbol contains account information, authenticity information and bearer information, (ii) adjusting a balance of the account identified in step d., and (iii) presenting said bearer with evidence of said account balance adjustment at the time of said adjustment.

2. The method of claim 1 wherein said first encrypted symbol is printed upon said document with ink that is invisible in natural light.

3. The method of claim 1 comprising the additional step of verifying authenticity of said document by comparing said document authenticity information with archived authentication data contained in a database.

4. The method of claim 1 comprising the additional step of identifying a bearer of said document by comparing said bearer information with archived bearer information contained in a database.

5. The method of claim 1 comprising the additional step of adjusting said balance of said account in real-time after scanning said first symbol.

6. The method of claim 1 wherein said account balance adjustment comprises an account debit.

7. The method of claim 1 wherein said account balance adjustment comprises an account credit.

8. A system for processing a bearer document comprising:

(a) a print station for affixing a first encrypted symbol to said document, wherein said symbol contains account information, authenticity information and bearer information;

(b) means for affixing a second encrypted symbol to a deposit slip;

(c) a transaction station comprising a scanner for reading and decoding information contained in said first symbol; wherein (i) a first account represented by said bearer document is debited in real-time by an amount specified by said document using said decoded information, (ii) a second account identified by the second symbol is credited by said amount specified by said document in real-time, and (iii) said bearer is presented with evidence of said account debit at the time of said debit;

(d) a deposit station comprising a scanner for reading and decoding information contained in said first and second symbols; wherein (i) said first account represented by said bearer document is debited in real-time by an amount specified by said document using said decoded information, (ii) said second account identified by the second symbol is credited by said amount specified by said document in real-time, and (iii) evidence of credit of said second account is presented in real time; and (d) a central processing station operationally connected to said print station and to said transaction station and to said deposit station and that adjusts said first account represented by said bearer document based upon said decoded information, wherein (i) said decoded information is transferred from said transaction station to said central processing station in real time, (ii) said decoded information is transferred from said deposit station to said central processing station in real time, (iii) said central processing station comprises an archive data base, and (iv) debiting and crediting of accounts comprises comparison of said transferred decoded information with information is said data base.

9. The system of claim 8 wherein said first encrypted symbol is printed upon said document with ink that is invisible in natural light.

10. The system of claim 8 wherein said central processing station comprises a CPU and authenticity of said document is verified by comparing within said CPU said authenticity information with archived authentication data contained in said database.

11. The system of claim 8 said central processing station comprises a CPU and identity of a bearer said document by comparing said bearer information with archived authorized bearer data contained in said data base.

12. A method for rendering a bearer document resistant to fraudulent processing, comprising the steps of:

(a) affixing to said document a first encrypted symbol, wherein said symbol comprises (i) document authenticating information, and (ii) bearer information specific to an authorized bearer of said document;

(b) establishing authenticity of said document by (i) decoding said document authenticating information, and (ii) comparing said decoded document authenticating information with archived authenticating information in a data base;

(c) identifying an authorized of a bearer of said document by (i) decoding said bearer information, and (ii) comparing said decoded bearer information with archived authorized bearer information in said database and with information obtained from a bearer; and (d) verifying the authenticity of the account which is to be settle by:

(i) affixing a second encrypted symbol to a deposit slip;

(ii) upon submission of the deposit slip, scanning the deposit slip, thereby decoding the second encrypted symbol;

(iii) identifying the account to be settled using information obtained from the second encrypted symbol.

13. The method of claim 12 wherein said first symbol is printed on said document with ink invisible in natural light.

14. The method of claim 12 comprising the additional steps of affixing to said document a digital image of a finger print of an authorized bearer of said document, wherein said image of a finger print is subsequently scanned and electronically compared with a finger print image obtained from said bearer.

15. The method of claim 12 comprising the additional steps of affixing to said document a digital image of an authorized bearer of said document, wherein said image is subsequently scanned and displayed and visually compared with the appearance of said bearer to establish authenticity of said bearer.

16. The method of claim 12 wherein said bearer document is a check.

17. Apparatus for rendering a bearer document resistant to fraudulent processing, comprising:

(a) a print station that affixes to said document a first encrypted symbol, wherein said symbol comprises (i) document authenticating information, and (ii) bearer information specific to an authorized bearer of said document, and;

(b) a central processing station operationally connected to said print station, wherein document authenticity is subsequently established by (i) decoding said document authenticating information, and (ii) comparing said decoded document authenticating information with archived authenticating information in a data base element of said central processing station;

(c) bearer identity is subsequently established by (i) decoding said bearer information, and (ii) comparing said decoded bearer information with archived authorized bearer information in said database and with information obtained from a bearer of said document; and (d) means for verifying the authenticity of an account to the settled comprising a second encrypted symbol on a deposit slip.

18. The apparatus of claim 17 wherein said print station comprises a printer and said first symbol is printed on said document with ink invisible in natural light.

19. The apparatus of claim 17 wherein a digital image of a finger print of said authorized bearer is affixed to said document at said print station, and wherein said image of said printed finger print is subsequently scanned and electronically compared with a finger print image obtained from said bearer.

20. The apparatus of claim 17 wherein a digital image of said authorized bearer is affixed to said document, wherein said image is subsequently scanned and displayed and visually compared with the appearance of said bearer to establish authenticity of said bearer.

21. The apparatus of claim 17 wherein said bearer document is a check.

22. A method for redeeming a bearer document at a transaction station, comprising the steps of:

(a) scanning said document when presented by a bearer;

(b) forming a digital image of said document;

(c) transmitting said digital image to a central processing station that is operationally connected to said transaction station;

(d) decoding an encrypted symbol affixed to said document;

(e) verifying authenticity of said document by comparing authenticity information decoded from said symbol with archived authenticity information stored in a data base at said central processing station;

(f) verifying identity of a bearer of said document by comparing authorized bearer information decoded from said symbol with archived authorized bearer information stored in said data base and with information obtained from said bearer;

(g) reconciling a first account balance for an amount specified on said document using first account data read from said document;

(h) settling a second account balance for said amount specified on said document using second account data transferred to said central processing station thereby completing a redemption process in real-time, the redemption process including scanning a second encrypted symbol on a deposit slip; and (i) providing evidence to said bearer in real-time of a completed redemption transaction.

23. The method of claim 22 comprising the additional steps of:

(a) printing said first encrypted symbol on said document using ink invisible in natural light; and (b) subsequently activating said ink in a scanner at said transaction station prior to forming said digital image.

24. The method of claim 23 wherein:

(a) said digital image includes an image of said first encrypted symbol; and (b) said decoding of said first encrypted symbol is performed at said central processing station using said digital image of said first encrypted symbol.

25. The method of claim 22 comprising the additional step of decoding said first encrypted symbol at said transaction station.

26. The method of claim 22 comprising the additional steps of:

(a) displaying said decoded authorized bearer information in clear text on a screen at said transaction station;

(b) using said displayed authorized bearer information to query said bearer; and (c) establishing bearer identity based upon said query.

27. The method of claim 25 comprising the additional steps of:

(a) affixing a digital image of an authorized bearer to said document;

(b) scanning said image on said document at said transaction station and displaying said image on said screen; and (c) identifying said bearer as an authorized bearer by comparatively viewing said image and said bearer.

28. The method of claim 24 comprising the additional steps of:

(a) affixing a finger print of an authorized bearer to said document;

(b) scanning said document at said transaction station and authorized finger print image;

(c) obtaining a bearer finger print image at said transaction; and (d) establishing identity of said bearer by comparing said authorized finger print image and said bearer finger print image.

29. The method of claim 22 wherein said bearer document comprises a check.

30. A transaction station apparatus for redeeming a bearer document, the apparatus comprising:

(a) a scanner that scans and forms a digital image of said document when presented by a bearer;

(b) a controller which controls said scanner and which transmits said digital image to a central processing station which is operationally connected to said transaction station;

(c) a decoder that decodes a first encrypted symbol affixed to said document and a second encrypted symbol affixed to a deposit slip;

(d) a display which displays (i) document authenticity information obtained from said decoded encrypted symbol and from a archived authenticity information stored in a data base in said central processing station, and (ii) authorized bearer information obtained from said decoded encrypted symbol and from archived authorized bearer information stored in said data base; and (e) a cancellation device that presents to said bearer in real-time evidence that redemption of said bearer document has been successfully completed.

31. The apparatus of claim 30 wherein said scanner comprises a light which activates ink used to print said first encrypted symbol, wherein said ink is invisible in natural light.

32. The apparatus of claim 31 further comprising a finger print digitizer operationally connected to said controller, wherein:

(a) an authorized finger print image is obtain from said data base when said document is scanned at said transaction station;

(b) a bearer finger print image is obtained from said bearer at said transaction station when said document is presented for redemption;

(c) said authorized finger print image and said bearer finger print image are compared; and (d) identity of said bearer is established by comparing said authorized finger print image and said bearer finger print image.

33. The apparatus of claim 30 wherein said bearer document comprises a check.

34. A method for depositing a bearer document at a deposit station, comprising the steps of:

(a) scanning said document when presented by a bearer;

(b) forming a digital image of said document;

(c) transmitting said digital image to a central processing station that is operationally connected to said transaction station;

(d) decoding a first encrypted symbol affixed to said document;

(e) verifying authenticity of said document by comparing authenticity information decoded from said first symbol with archived authenticity information stored in a data base at said central processing station;

(f) identifying an account to be settled using an account identity input into an input device at said deposit station and transmitting said account identity to said central processing station;

(g) reconciling a first account balance for an amount specified on said document using first account data read from said document;

(h) settling a second account balance of said account to be settled for said amount specified on said document thereby completing a redemption process in real-time;

(i) providing evidence to a bearer of said document in real-time of a completed deposit transaction;

(j) storing said document for subsequent pickup;

(k) decoding the first encrypted symbol at the deposit station;

(l) scanning a deposit slip at said deposit station and decoding a second encrypted symbol affixed to said deposit slip; and (b) identifying said account to be settled using information obtained from said second encrypted symbol.

35. The method of claim 34 comprising the additional steps of:

(a) printing said first encrypted symbol on said document using ink invisible in natural light; and (b) subsequently activating said ink in a scanner at said transaction station prior to forming said digital image.

36. The method of claim 35 wherein:

(a) said digital image includes an image of said first encrypted symbol; and (b) said decoding of said first encrypted symbol is performed at said central processing station using said digital image of said first encrypted symbol.

37. The method of claim 34 comprising the additional step of identifying said bearer as an authorized bearer by comparing information obtained from said second encrypted symbol with archived identity information stored in said data base at said central processing station.

38. The method of claim 34 wherein said bearer document comprises a check.

39. A deposit station apparatus for implementing a deposit transaction of a bearer document, the apparatus comprising:

(a) a scanner that scans and forms a digital image of said document when presented by a bearer;

(b) a controller which controls said scanner and which transmits said digital image to a central processing station which is operationally connected to said transaction station;

(c) a decoder that decodes a first encrypted symbol affixed to said document and a second encrypted symbol affixed to a deposit slip;

(d) a display which displays document authenticity information obtained from said decoded encrypted symbol and from a archived authenticity information stored in a data base in said central processing station; and (e) a receipt device that presents to said bearer in real-time evidence that said deposit transaction has been successfully completed.

40. The apparatus of claim 39 wherein said scanner comprises a light which activates ink used to print said first encrypted symbol, wherein said ink is invisible in natural light.

41. The apparatus of 39 claim further comprising a storage device in which said document is held for subsequent pickup.

42. The apparatus of claim 1 wherein said document is a check.

43. A method for processing a check, wherein:

(a) check redemption comprises the steps of (i) scanning said check when presented by a bearer, (ii) forming a digital image of said check, (iii) transmitting said digital image to a central processing station that is operationally connected to said transaction station, (iv) decoding a first encrypted symbol affixed to said check and a second encrypted symbol affixed to a deposit slip, (v) verifying authenticity of said check by comparing authenticity information decoded from said symbol with archived authenticity information stored in a data base at said central processing station, (vi) verifying identity of said bearer of said check by comparing authorized bearer information decoded from said symbol with archived authorized bearer information stored in said data base and with information obtained from said bearer, (vii) reconciling a first account balance for an amount specified on said check using first account data read from said check, (viii) settling a second account balance for said amount specified on said document using second account data decoded from the second encrypted symbol, thereby completing a redemption process in real-time, and (ix) providing evidence to said bearer in real-time of a completed redemption transaction; and (b) check deposit comprises the steps of (i) scanning said check when presented by a bearer, (ii) forming a digital image of said check, (iii) transmitting said digital image to a central processing station that is operationally connected to said transaction station, (iv) decoding an encrypted symbol affixed to said check, (v) verifying authenticity of said check by comparing authenticity information decoded from said symbol with archived authenticity information stored in a data base at said central processing station, (vi) identifying a account to be settled using an input device at said deposit station and transmitting account identity to said central processing station;

(vii) reconciling a first account balance for an amount specified on said check using first account data read from said document, (viii) settling a second account balance of said account to be settled for said amount specified on said check thereby completing a redemption process in real-time, (ix) providing evidence to a bearer of said check in real-time of a completed deposit transaction, and (x) storing said check for subsequent pickup.

44. The method of claim 1, wherein the bearer information includes a personal identification number.

45. The method of claim 8, wherein the bearer information includes a personal identification number.

46. The method of claim 34, wherein the bearer information includes a personal identification number.

* * * * *